Dec. 10, 1963

J. S. JACKSON 3,113,662

CONVEYOR BELT TENSION DEVICE

Filed Aug. 29, 1961

2 Sheets-Sheet 1

Inventor:
JAMES SCOTT JACKSON

By
Attorneys.

Inventor.
JAMES SCOTT JACKSON

United States Patent Office 3,113,662
Patented Dec. 10, 1963

---

3,113,662
CONVEYOR BELT TENSION DEVICE
James S. Jackson, Chesterfield, England, assignor to Mavor & Coulson Limited, Glasgow, Scotland
Filed Aug. 29, 1961, Ser. No. 134,661
Claims priority, application Great Britain Sept. 7, 1960
2 Claims. (Cl. 198—208)

This invention relates to loading machines comprising automotive vehicles used in coal mines, quarries and other works for gathering broken down materials at the front end of the machine and conveying the material for delivery from the rear end.

In such machines the frame is topped by a side-walled conveyance passage along which travels the working run of a conveyor consisting of an endless chain with transverse flights, the chain being trained around a driving pulley at one end of the passage and a tensioning pulley at the opposite end.

The present invention is concerned with loading machines as aforesaid of the type in which the frame is in two main components, one of them being the vehicular body of the machine and the other a rearwardly extending jib, these components having a joint between them by virtue of which the jib can be slewed to either side through a substantial angle.

In loading machines of the type stated, when the jib is slewed to either side, the path of the conveyor chain shortens whereas the length of the conveyance passage remains constant, so that the chain tends to slacken. In practice this tendency is countered by the provision of tensioning means of which various kinds are known, the tensioning means being applied to the tensioning pulley and being devised to maintain the tension of the conveyor chain more or less constant.

The object of the present invention is to provide a simplified mechanical tensioning means.

The invention is a loading machine of the type stated in which the jib is connected at both sides through linkages with the vehicular body, each linkage having one-way anchorages respectively on the jib and on the body by virtue of which anchorages during slewing one linkage will move along the jib whereas the other will not, and in which a spring device applied to the tensioning pulley and including a lever that has pivotal connections with both linkages is movable, by that one of the linkages which is set in motion during slewing, to maintain the conveyor chain tension nearly constant.

Figure 1:
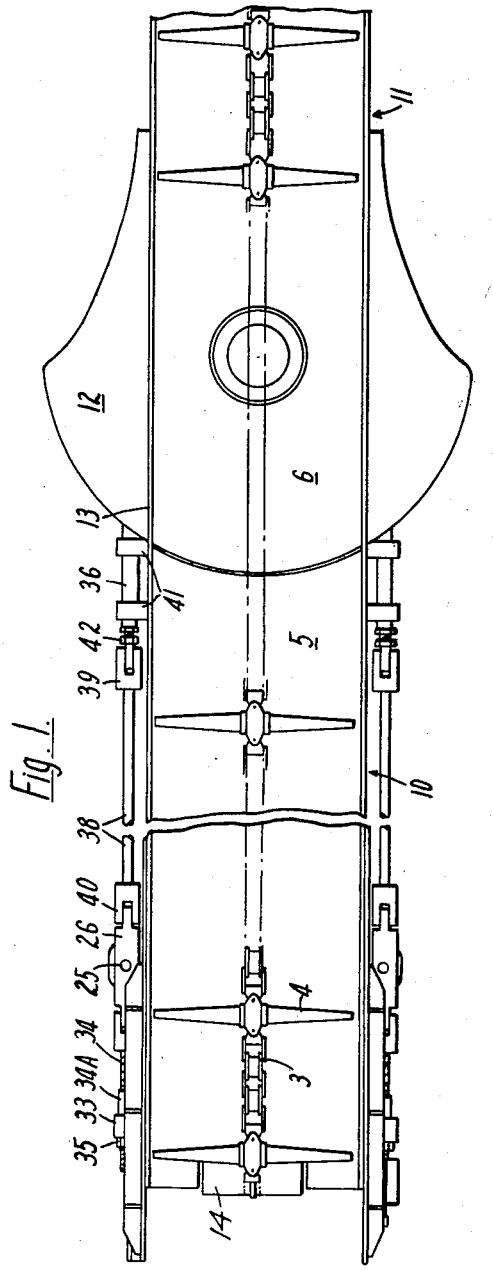
Figure 2:
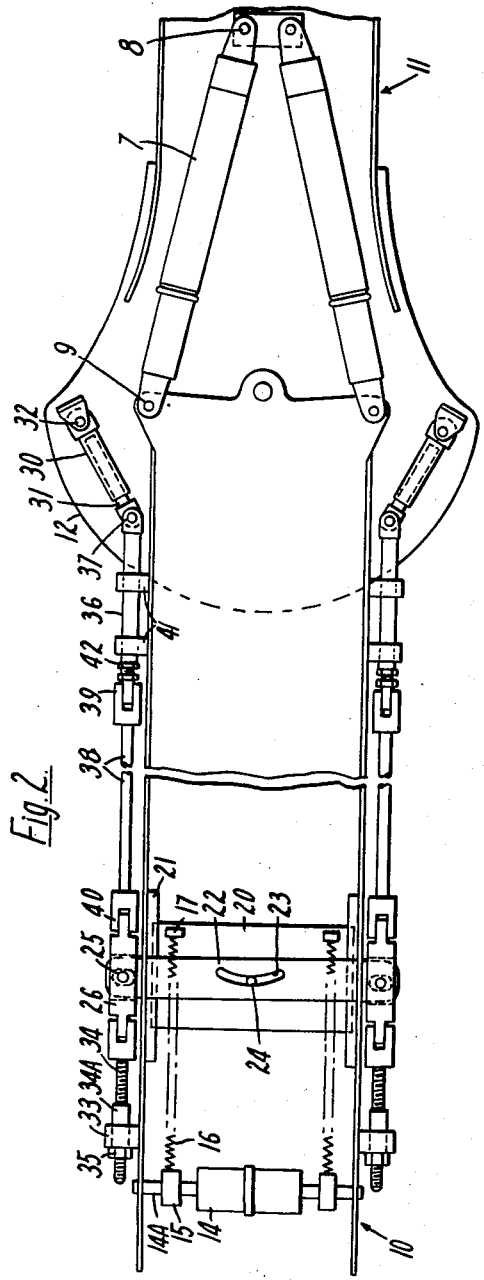

The invention is illustrated by way of example in the accompanying drawing in which:

FIG. 1 is a plan of the jib and associated end of the vehicular body of a loading machine of the type stated, and FIG. 2 is a similar view with upper level parts removed to show more fully parts embodying the invention.

As FIG. 1 shows, the conveyor of the loading machine is of the class comprising a single endless chain 3, to which are secured transverse equi-spaced flights 4, and a conveyance passage consisting of two side-walled plates 5 and 6 which, in the position shown, are a rectilinear continuation of one another. In FIGS. 1 and 2, the jib is indicated by 10 and a part of the vehicular body by 11. These parts 10 and 11, like the plates 5 and 6 which they respectively include, constitute a continuation of one another, and the arrangement may be such that both of them can be raised and lowered as a unit in relation to the wheeled chassis (not shown) of the body. The jib 10, however, when slewed from the central position in which it is shown, swings sidewise in either direction relatively to the body part 11. The means for slewing the jib consist of a pair of hydraulic jacks 7 each of which is pivotally connected at 8 and 9 to the body part 11 and jib 10, respectively.

The body part 11 has side wings 12. Moreover the jib 10 and body part 11 have side walls 13 serving as the walls of the conveyor and consisting of thin plates which are flexible and which bend whenever the jib 10 is slewed to one or other side. The jib 10 at its free end carries an idler pulley 14 for the conveyor chain 3. The axles 14A of the pulley are supported by bearings 15 which are acted upon by compression springs 16 reacting against abutments 17.

In the example, the various parts at one side of the jib 10 and body part 11 are similar to those at the other side, and so reference numbers have been applied in the drawing only to the parts at one side.

The springs 16 form components of a spring device including also a supporting plate 20 which is movable longitudinally of the jib 10 under guidance of slideways 21 at opposite sides of the jib. The spring device also includes a lever 22, this lever being formed with an arcuate slot 23 which is engaged midway of the length of the lever by a central pin 24 on the plate 20. The lever 22 has a pivot pin 25 at each end.

There is provided at each side of the jib 10 and body 11 a linkage which extends between a one-way anchorage on the jib and a one-way anchorage on the wing 12.

Each of the two linkages includes a connector 26 which is connected to the pivot pin 25 on the associated end of the lever 22.

The one-way anchorage on each wing 12 consists of a two-part telescopic link 30, 31 the part 30 of which has a pivotal connection 32 to the wing 12 and the other part 31 of which is slidable from a fully contracted position which the link parts 31 at both sides adopt in the mid-position of the jib 10, as shown in FIG. 2. Each one-way anchorage on the jib consists of a bearing bracket 33 secured to the jib, a screwed rod 34 and a sleeve 34A which is slidable through the bracket 33 and an adjustable nut 35 on the rod. Both nuts at opposite sides bear against their brackets 33, under the pressure of the springs 16, in the mid-position of the jib 10. The linkage at each side also includes a link 36 which is pivoted, at 37, at one end to the telescopic part 31 and a link 38 which is pivoted at 39 to the link 36 and at 40 to the connector 26. The link 36 is slidable through bearing brackets 41 on the side wall 13 and it has a screw device 42 for adjusting its length.

The various parts are shown in the position which they adopt in the mid-position of the jib. Assume that the jib is slewed from its mid-position in, say, the clockwise direction as viewed in the drawings, so that the conveyor chain will tend to slacken. The parts at the side numbered in the drawings which form the one-way anchorages and the linkage between said anchorages act as follows, namely:

The telescopic parts 30, 31 remain fully contracted, the anchorage part 30 serving as an abutment, and they force the linkage 36, 38, 26 to move outwards along the jib 10 (i.e. towards the free end of the jib) forcing the rod 34 and collar 34A of the other one-way anchorage to move freely through the bracket 33, so that the nut 35 is displaced from this bracket. This movement forces the lever 22 to turn counter-clockwise about its pivotal connection 25 with the connector 26 at the opposite side of the jib; and accordingly the plate 20 is forced by the lever to slide outwards, thus displacing outwards the abutments 17 of both springs 16 and by so doing countering the tendency of the conveyor chain to slacken and maintaining the tension in the chain nearly constant.

During the action above described of the one-way anchorages and linkage numbered at one side of the jib 10 and body part 11, the linkage at the other side remains stationary, being held against movement by the nut 35 at that side bearing against the anchorage bracket 33, which serves as an abutment. On the other hand, the telescopic link 30, 31 at this side extends, the part 31 sliding freely outwards through the part 30 towards the free end of the jib.

In the return of the jib to or towards its mid-position, the various parts would return to or towards the positions shown in the drawings.

I claim:

1. In a loading machine having a vehicular body, a rearwardly extending jib pivotally connected to said body so that the jib can be slewed to either side of a mid-position, means connected between the body and jib for slewing the jib, an endless conveyor supported by said body and jib and including a tensioning pulley carried by bearings near the jib end, said pulley being movable along the jib, and conveyor-tensioning compression springs abutting said pulley bearings at one end; a single support for the springs movable along the jib, abutments on said support abutting the other end of said springs, a transverse lever, a pivotal connection between said lever and said support about midway of the length of the lever and permitting fore-and-aft pivotal movement of said lever, linkages at opposite sides of the jib guided for movement lengthwise thereof, a connector in each linkage, a pivotal connection between each connector and the adjacent end of the lever, anchorage abutments on opposite sides of the jib, and anchorage abutments on opposite sides of the vehicular body, each of said abutments being associated with a part connected to the associated connection and slidable from the associated abutment towards the jib end, whereby, when the jib is slewed the linkage at one side is constrained to move along the jib, the linkage swings said lever about the connector at the opposite side, and the lever moves said support carrying the spring abutments towards the outer end of the jib in order to maintain the conveyor tension.

2. A loading machine as claimed in claim 1, in which the jib includes a floor, and the lever and support are located below said floor, whereby the weight of material on the floor is not transferred down on to said lever and support.

References Cited in the file of this patent

UNITED STATES PATENTS 3,008,566     Biedess _____ Nov. 14, 1961